United States Patent
Dunn et al.

(10) Patent No.: US 11,587,552 B2
(45) Date of Patent: Feb. 21, 2023

(54) REAL TIME KEY CONVERSATIONAL METRICS PREDICTION AND NOTABILITY

(71) Applicant: Sutherland Global Services Inc., Rochester, NY (US)

(72) Inventors: Eric Jee-Keng Dunn, Milpitas, CA (US); Dmytro Kovalchuk, Corte Madera, CA (US); Brenton William D'Adamo, San Francisco, CA (US)

(73) Assignee: Sutherland Global Services Inc., Pittsford, NY (US)

( * ) Notice: Subject to any disclaimer, the term of this patent is extended or adjusted under 35 U.S.C. 154(b) by 79 days.

(21) Appl. No.: 16/863,613

(22) Filed: Apr. 30, 2020

(65) Prior Publication Data

US 2020/0388271 A1 Dec. 10, 2020

Related U.S. Application Data

(60) Provisional application No. 62/841,140, filed on Apr. 30, 2019.

(51) Int. Cl.
*G10L 15/06* (2013.01)
*G10L 15/26* (2006.01)
(Continued)

(52) U.S. Cl.
CPC .......... *G10L 15/063* (2013.01); *G06N 20/00* (2019.01); *G06Q 30/0281* (2013.01); *G10L 15/26* (2013.01); *G10L 2015/0638* (2013.01)

(58) Field of Classification Search
CPC .............. G10L 15/063; G10L 15/26; G10L 2015/0638; G10L 15/1815; G06N 20/00;
(Continued)

(56) References Cited

U.S. PATENT DOCUMENTS 10,353,996 B2 * 7/2019 Bellamy ............... A61B 5/165
10,460,749 B1 * 10/2019 Ru ....................... G10L 15/063
(Continued)

FOREIGN PATENT DOCUMENTS

WO WO 2018/048934 A1 3/2018
WO WO 2018/048945 A1 3/2018
(Continued)

OTHER PUBLICATIONS

Hughes, R., "DeepMind: First major AI patent filings revealed," The IPKat, Jun. 7, 2018, three pages, [Online] [Retrieved on Jul. 24, 2020], Retrieved from the Internet<URL: http://ipkitten.blogspot.com/2018/06/deepmind-first-major-ai-patent-filings.html>.

*Primary Examiner* — Michael Colucci
(74) *Attorney, Agent, or Firm* — Woods Oviatt Gilman LLP; Dennis B. Danella, Esq.

(57) ABSTRACT

A system and a method are disclosed for alerting a manager device to an occurrence of an event an agent device during a conversation between the agent device and an external party. N an embodiment, a processor receives transcript data during a conversation between the agent device and the external party. The processor normalizing the transcript data, and inputs the normalized transcript data into a machine learning model, the machine learning model trained to identify an inflection point in the conversation. The processor receives, as output from the machine learning model, a measure of notability of the normalized transcript data. The processor determines whether the measure of notability corresponds to an inflection point, and, responsive to determining that the measure of notability corresponds to an inflection point, alerts the manager device.

28 Claims, 6 Drawing Sheets

(51) Int. Cl.
*G06Q 30/02* (2012.01)
*G06N 20/00* (2019.01)

(58) Field of Classification Search
CPC .... G06N 3/0445; G06N 3/08; G06Q 30/0281; G06F 40/216; G06F 40/284; G06F 40/30; G06F 16/90332; G06F 16/285
See application file for complete search history.

(56) References Cited

U.S. PATENT DOCUMENTS

| | | | | |
|---|---|---|---|---|
| 10,628,133 | B1* | 4/2020 | Jiang | H04L 51/02 |
| 11,120,199 | B1* | 9/2021 | Bachtiger | G06F 40/284 |
| 2001/0021909 | A1* | 9/2001 | Shimomura | G10L 15/22 |
| | | | | 704/E15.04 |
| 2011/0060587 | A1* | 3/2011 | Phillips | G10L 15/30 |
| | | | | 704/235 |
| 2014/0199676 | A1* | 7/2014 | Chen | G10L 15/01 |
| | | | | 434/362 |
| 2015/0149177 | A1* | 5/2015 | Kalns | G10L 15/1822 |
| | | | | 704/257 |
| 2016/0179831 | A1* | 6/2016 | Gruber | G10L 19/018 |
| | | | | 704/235 |
| 2017/0186425 | A1* | 6/2017 | Dawes | G10L 15/1815 |
| 2018/0039888 | A1* | 2/2018 | Ge | G10L 17/04 |
| 2018/0054523 | A1* | 2/2018 | Zhang | G06F 16/90332 |
| 2019/0205794 | A1* | 7/2019 | Hsu | G06F 16/285 |
| 2019/0362020 | A1* | 11/2019 | Paulus | G06N 3/006 |

FOREIGN PATENT DOCUMENTS

| | | |
|---|---|---|
| WO | WO 2018/064591 A1 | 4/2018 |
| WO | WO 2018/071392 A1 | 4/2018 |
| WO | WO 2018/081089 A1 | 5/2018 |
| WO | WO 2018/083532 A1 | 5/2018 |
| WO | WO 2018/083667 A1 | 5/2018 |
| WO | WO 2018/083668 A1 | 5/2018 |
| WO | WO 2018/083669 A1 | 5/2018 |
| WO | WO 2018/083670 A1 | 5/2018 |
| WO | WO 2018/083671 A1 | 5/2018 |
| WO | WO 2018/083672 A1 | 5/2018 |

\* cited by examiner

Customer Metric Configuration

| | | |
|---|---|---|
| Customer Metric | Customer NPS | 310 |
| Metric Type ▼ | Regression ▼ | 320 |
| Retraining Method | Training Set Size ▼ | 330 |
| Notability Threshold Min | 2 ▼ | 340 |

Cancel　　Save

REAL TIME KEY CONVERSATIONAL METRICS PREDICTION AND NOTABILITY

CROSS REFERENCE TO RELATED APPLICATIONS

This application claims the benefit of U.S. Provisional Application No. 62/841,140, filed Apr. 30, 2019, the disclosure of which is hereby incorporated by reference herein in its entirety.

BACKGROUND

A critical need of enterprise businesses is to understand the make-up of conversations between them and their customers. By understanding the makeup of conversations, business can determine which of those conversations are important to act on.

Unfortunately, it has been historically difficult to analyze conversations, because key metrics are not available, and key moments are often not known. The problem is not channel specific either, as it may occur in any domain involving back-forth-conversations, such as chat, SMS, and phone.

Examples of these metrics include, but are not limited to Net Promoter Score (NPS), Customer Satisfaction (CSAT), Sales Conversion, and First Contact Resolution.

Related art implementations are not optimized for prediction of a specific metric or moments in the conversation. An example would be sentiment analysis. While related art systems may achieve a weak signal of happiness/anger for a customer, these related art systems do not have an accurate correlation to actual customer survey scores which today's enterprises use to make key decisions. Even weaker is their ability to identify which moment in the conversation affected the metrics most.

Even with the advent of modern machine learning techniques, like Artificial neural networks, related art implementations have failed to develop a model architecture that utilizes normalized data sources well to achieve high quality results.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
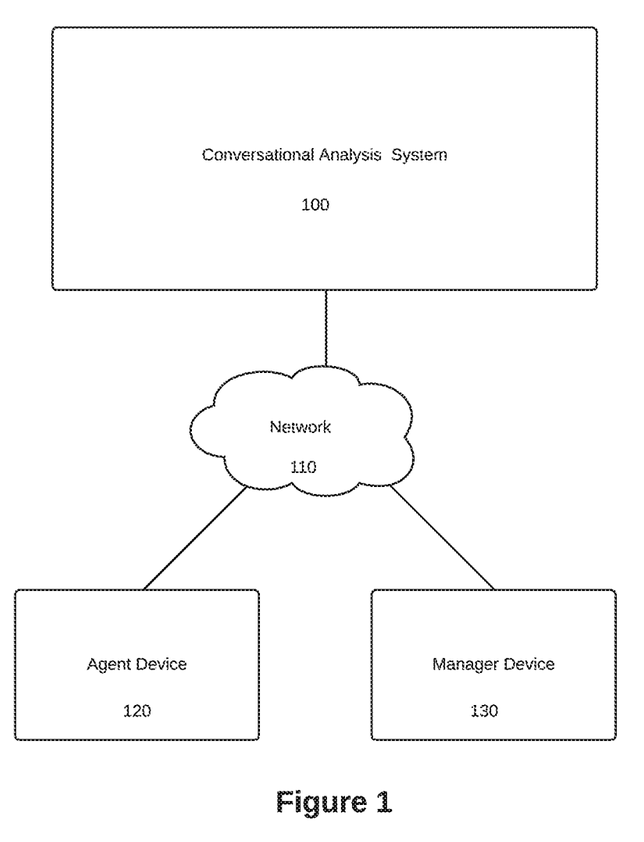
FIG. 1 depicts an exemplary embodiment of the high level system, with related personas, and how those personas interact with the system providing the functionality.

FIG. 1 depicts an exemplary environment for use of a conversational analysis system. The Conversational Analysis System 100 is a robust system that helps identify key opportunities in conversational data by both predicting key metrics and moments in the conversation. The environment includes conversational analysis system 100, network 110, agent device 120, and manager device 130. While only one of each entity is depicted, this is for convenience only, and there may be many agent devices and manager devices in the system. Moreover, the functionality of conversational analysis system 100 may be spread over multiple servers and/or client devices.

Conversational analysis system 100 provides estimations on key metrics, and alerts on key notable scenarios to both agents and managers. Further details of conversational analysis system 100 are described in further detail below with respect to FIG. 1.

Conversational analysis system 100 communicates with agent device 120 and manager device 130 over network 110. Network 110 is a communication layer that can receive requests to the Conversational Analysis System 100, and receive responses back to the agent device 120 or manager device 130 (such as a local intranet using HTTPS, or using the internet using HTTPS).

Agent device 120 is typically a machine with an application (such as a web browser) that can make requests and receive requests over the network. This device is used by contact server customer support representatives. The customer support representatives use the application to receive the estimations on key metrics, and alerts on notable scenarios for a given chat.

Manager device 130 is typically a machine with an application (such as a web browser) that can make requests and receive requests over the network. This device is used by contact server customer support managers. The customer support representatives use the application to receive the estimations on key metrics, and alerts on notable scenarios for a given chat.

Figure 2:
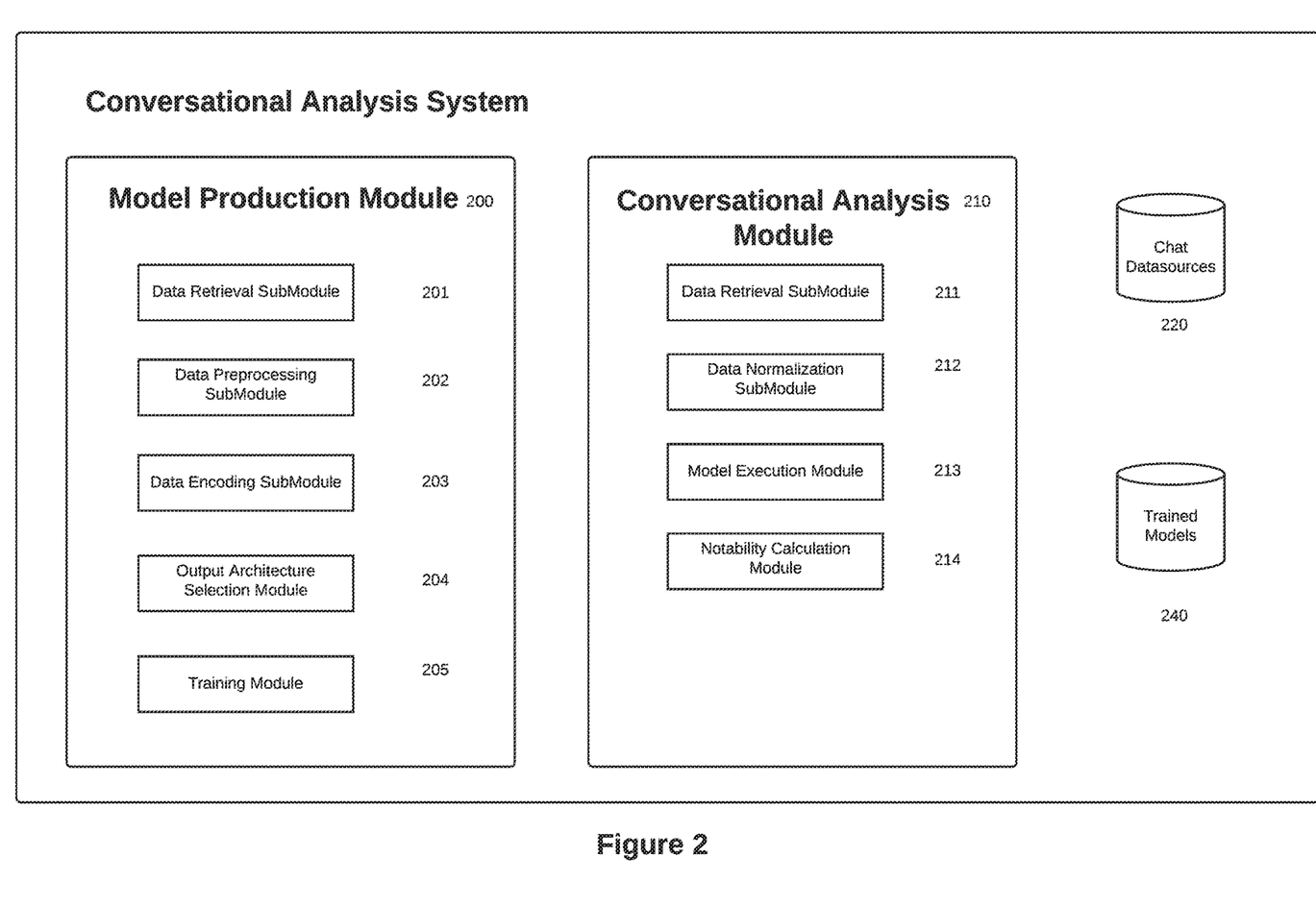
FIG. 2 depicts an exemplary embodiment of the Conversational Analysis System, and notes key components for both the Model Production Module, the Conversational Analysis Module, as well as the relevant Data Repositories.

FIG. 2 depicts the main modules of the conversational analysis system 100, as well as a detailed embodiment of submodules that allow for model training and notability estimation process using said model.

Model Production Module

The model production module 200 provides machine learning trained models 240 to the rest of the conversational analysis system 100, specifically the conversational analysis module 210. It does so by using a collection of submodules to retrieve needed data, preprocess the data, encode the data, select the appropriate output, and train the machine learning models 240.

The Data Retrieval Module 201 is a key submodule in the Model Production Module 200. The Data Retrieval Module requests and transfers data from data sources 220 (such as CRMs, Chat Systems, Telephony Systems, etc.) to the conversational analysis system 100, using a data transfer protocol such as an API, or SFTP.

This data can include, but is not limited to, Transcript Data (e.g., text or voice input of a customer, customer service agent, or any other participant of interaction; timing data corresponding to transcript, etc.), as well as auxiliary data such as Timings (e.g., time of day, time of each message in transcript of a call/chat log, time elapsed between messages, etc.), Customer Success Metrics (e.g., NPS, CSAT, etc.), Customer Demographics (e.g., age, gender, etc.), and 'moments' critical to conversational Analysis (Utterances labeled by type, 'Hello'=Greeting). The Data Retrieval Module 201 converts the data to standard format for preprocessing, by mapping data fields to inputs to our preprocessing step below. This format is a general chat, demographic and metric data structure.

Another key submodule is the Data Preprocessing Module 202. In an embodiment, the Data Preprocessing Module 202 preprocesses the retrieved data to provide a high-quality data-set used for training. This allows for better accuracy during model predictions.

The Data Preprocessing Module 202 employs a number of processes to normalize and preprocess raw textual data. First, the Data Preprocessing Module 202 strips the predetermined information from the data (e.g., HTML and other special characters). The Data Preprocessing Module 202 then does anonymization of personal data. The Data Preprocessing Module 202 uses trained Named Entity Recognition (NER) models to identify and replace mentions of customer names, phone numbers, emails, addresses, etc. with corresponding general tokens—[name], [phone], [email], [address]. Once completed, the Data Preprocessing Module 202 follows with generalization using custom trained NER models. In an embodiment, the Data Preprocessing Module 202 identifies and replaces domain specific keywords and terms with generalized tokens. For example, the Data Preprocessing Module 202 replaces a company's product mentions with a [product id='product_id'] token.

Finally, outcome metric data, such as NPS, also have additional processing steps as part of the process, which also aid in the accuracy of the model. The Data Preprocessing Module 202 converts revenue data into binary type (e.g., 'has_sale'—yes/no). The Data Preprocessing Module 202 then converts outcomes like NPS from numerical point based metrics to a categorical data type (e.g., NoRating/Detractor/Neutral/Promoter).

After preprocessing, the Data Encoding Submodule 203 encodes the data output from the Data Preprocessing Module 202 into a custom format for model training. Key to the accuracy and effectiveness of the process are how the inputs are encoded. In an embodiment, the Data Encoding Submodule 203 maps message text (or voice data that is converted to text using speech-to-text technology) to a fixed length dense vector embedding using an encoder that is tuned to natural language inference. The fixed-length dense vector encodes message text by assessing each word's representation in vector space, across typically hundreds of dimensions. This is possible by using a separately-trained model that assigns similar vector spaces to similar words (i.e. 'person' is similar to 'individual'). Side data (speaker, time between responses) is then concatenated to the dense text vector to form a complete message vector.

The Output Architecture Selection Module 204 sets the configuration of which outcome metrics the Model Production Module should produce. The Output Architecture Selection Module 204 whether to a regression (in the case of predicting a numerical value), or a classification (in the case of predicting label categories) 310. This configuration is then used in the Training Submodule 205.

The Training Submodule 205 generates the training data, does the actual training process itself, judges sufficiency, and does continuous learning.

To generate the training data, the Training Submodule 205 creates data samples using the encodings provided by the Data Encoding Submodule 203, and a process called 'inflation'. The Training Submodule 205 performs inflation by providing a unique representation at each step in the conversation. For instance, to generate the representation for message M, the Training Submodule 205 considers the representation for that message M, and each representation for the previous messages.

Also in this step, the Training Submodule 205 generates positive and negative examples for 'moments' critical to the conversation. The Training Submodule 205 does this by taking the utterances labeled by type provided by the Data Retrieval Module 201, and their result mapped fixed length vectors from the Data Encoding Submodule 203, and determines both positive and negative examples by cosine similarity.

We now discuss the actual training process. After the Training Submodule 205 generating the representations using inflation, combinations of utterances are then encoded together and then run through the model neural network layers to properly train the model. Although a variety of network approaches can be chosen, the Training Submodule 205 generally uses Neural Networks to efficiently generate the representations the combination of utterances (also known as conversational context). Depending on the outcome being estimated, the Training Submodule 205 may decide between various loss functions (Mean squared error, cross entropy). The Training Submodule 205 then produces the trained models 240.

The Training Submodule 205 then performs training sufficiency estimation. The Training Submodule 205 determines which metrics are necessary to know whether the trained models 240 have been properly trained. This may include, but not limited to, metrics like mean squared error, and recall/precision.

For classification, the Training Submodule 205 may run until a configured certain condition is detected. For example, the Training Submodule 205 may run the training module for the trained models 240 continuously until the system detects loss stops decreasing (e.g., by a certain amount or rate), and/or other metrics rate of change flatten to a configurable value. The Training Submodule 205 may then additionally test on a holdout set of messages, which is used to validate that the model it is not overfitting to a validation set. The holdout set is generated by the Training Submodule 205 using a set class balance, and time distribution.

For regression, the Training Submodule 205 determines quality of performance by comparing a baseline average response metric with what the model provides at different points in the conversation, and adjusts training data until baseline mean error is within a configurable percentage of the total potential regression score.

The Training Submodule 205 also is responsible for continuous learning. In an embodiment, the Training Submodule 205 continues to retrieve from Chat Data Sources 220 on an ongoing basis (e.g., periodically, in response to user input, etc.). The Training Submodule 205 retrains the trained models 240 based on the variety of chat data provided by Chat Data Sources 220, and in doing so also updates its test and validation set data. In addition, the Training Submodule 205 may kick-off retraining based on drift based on summary statistics, such as time delta since last training, sufficiency in training set size, accuracy thresholds for current model performance.

Conversational Analysis Module

The other major component to the Conversational Analysis System 100 is the Conversational Analysis Module 210. The Conversational Analysis Module 210 predicts outcome metrics and notable moments in the conversation. Using the trained models 240 from the Model Production Module 200, the Conversational Analysis Module 210 uses submodules to generate the outcome metrics and alert on notable moments.

The Data Retrieval Module 211 is a key submodule in the Conversational Analysis Module 210. The Data Retrieval Module requests and transfers data from data sources 220 (such as CRMs, Chat Systems, Telephony Systems, etc.) to the conversational analysis system 100, using a data transfer protocol such as an API, or SFTP.

This data can include, but is not limited to, Transcript Data (e.g., text or voice input of a customer, customer service agent, or any other participant of interaction; timing data corresponding to transcript, etc.), Timings (e.g., time of day, time of each message in transcript of a call/chat log, time elapsed between messages, etc.), Customer Success Metrics (e.g., NPS, CSAT, etc.), Customer Demographics (e.g., age, gender, etc.), and 'moments' critical to conversational Analysis (Utterances labeled by type, 'Hello'=Greeting). The Data Retrieval Module 211 converts the data to standard format for preprocessing, by mapping data fields to inputs to our preprocessing step below. This format is a general chat, demographic and metric data structure.

The Data Normalization Submodule 212 employs a number of processes to normalize and preprocess raw textual data. First, the Data Normalization Submodule 212 strips the predetermined information from the data (e.g., HTML and other special characters). The Data Normalization Submodule 212 then does anonymization of personal data. Data Normalization Submodule 212 uses trained Named Entity Recognition (NER) models to identify and replace mentions of customer names, phone numbers, emails, addresses, etc. with corresponding general tokens—[name], [phone], [email], [address]. Once completed, the Data Normalization Submodule 212 follows with generalization using custom trained NER models. In an embodiment, the Data Normalization Submodule 212 identifies and replaces domain specific keywords and terms with generalized tokens. For example, the Data Normalization Submodule 212 replaces a company's product mentions with a [product id='product_id'] token.

Finally, outcome metric data, such as NPS, also have additional processing steps as part of the process, which also aid in the accuracy of the model. The Data Normalization Submodule 212 converts revenue data into binary type (e.g., 'has_sale'—yes/no). The Data Normalization Submodule 212 then converts outcomes like NPS from numerical point based metrics to a categorical data type (e.g., NoRating/Detractor/Neutral/Promoter).

After preprocessing, the Data Normalization Submodule 212 encodes into a custom format for model training. Key to the accuracy and effectiveness of the process are how the inputs are encoded. In an embodiment, the Data Normalization Submodule 212 maps message text (or voice data that is converted to text using speech-to-text technology) to a fixed length dense vector embedding using an encoder that is tuned to natural language inference. The fixed-length dense vector encodes message text by assessing each word's representation in vector space, across typically hundreds of dimensions. This is possible by using a separately-trained model that assigns similar vector spaces to similar words (i.e. 'person' is similar to 'individual'). Side data (speaker, time between responses) is then concatenated to the dense text vector to form a complete message vector.

The Model Execution Submodule 213 takes the trained models 240 provided by the Model Production Module 200, and feeds it the encoded data from the Data Normalization Module 212. The Model Execution Submodule 213 outputs an accurate estimate of the configured key outcome metrics (otherwise referred to herein as a measure of notability), whether it be NPS and Sales conversion, or classification of a moment.

The Notability Calculation Submodule 214 will then calculate notability using the results from the Model Execution Module 213 to identify the notability grade of the current point in the conversation.

There are several methods executed as part of the process. First, the Notability Calculation Submodule 214 will determine when is the largest decrease in the outcome metric, while placing configurable bounds on said decreases over any range attributes. An example of this would be if in a conversation, we are tracking the conversational metric 'NPS'. The Notability Calculation Submodule 214 can be configured so that upon a drop of two points on a one-to-ten scale, an alert is triggered.

Next, the Notability Calculation Submodule 214 will determine positive classification of a single moment, or multiple moments in a conversation. An example of this would be using a 'Refund' Classifier, the Notability Calculation Submodule 214 can identify a refund occured ten messages into a conversation.

The Notability Calculation Submodule 214 can then apply any combination of these methods to alert end users on notability. An example of this is 'NPS drop of 20%, Positive Classification of Refund scenario confirmed'.

Figure 3:
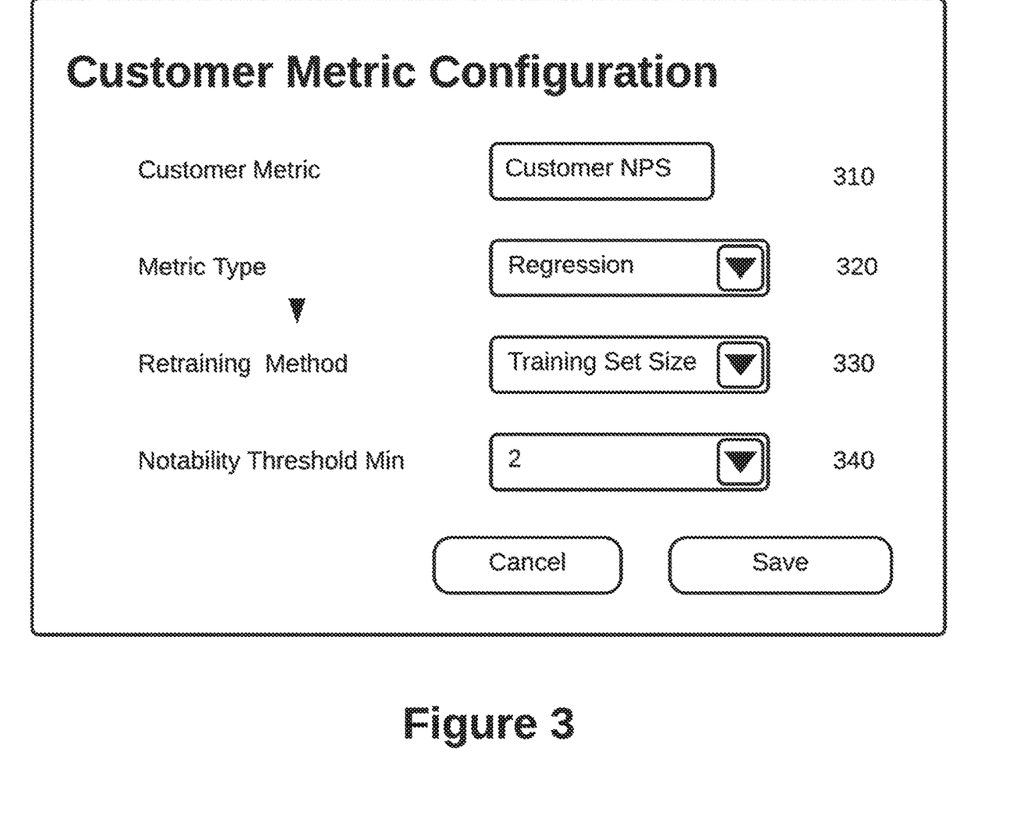
FIG. 3 depicts exemplary embodiments including interesting user Interfaces for configuration, and depicts the ability to adjust methods of training, and configurability of detection.

FIG. 3 depicts an exemplary user interface for configuring the type of predicted metric the Conversational Analysis System 100 produces. It especially informs the Training Module 205 how to perform during training. The user interface includes options for customer metric 310, metric type 320, retraining method 330, and notability threshold 340.

For customer metric 310, the user is selecting which customer metric they want to configure for metric prediction. The user can be presented with any metric which has been made available as part of Chat Datasources 220 in FIG. 2, such as NPS and CSAT.

The user can also choose the metric type 320. The options here are regression or classification, which allows the user to pick whether this predicted metric is a numeric value (in case of regression), or a positive identification (in case of classification).

Retraining method 330 is also an option which can be configured. This informs the Training Module 205 whether to retrain periodically via what method. Options here include Training Set Size, Drift, and Time Delta.

The final configuration in FIG. 3 is for Notability Threshold, which is available if the metric type is 'Regression'. This allows the user to choose when alerts for this metric should be by default fired if there is a drop of a certain level in the metric. For example, for customer NPS, if a drop is detected in predicted score of 2, on a 1-10 scale, an alert is fired.

Once the user has selected between the configurations of customer metric 310, metric type 320, retraining method 330, and notability threshold 340 in FIG. 3, the user can then save the settings, and let the Conversational Analysis System 100 produce trained models 240 and provide the key metrics and notable moments generated by the Conversational Analysis Module 210. A notable moment, as used herein, may also be referred to as an inflection point in a conversation.

Figure 4:
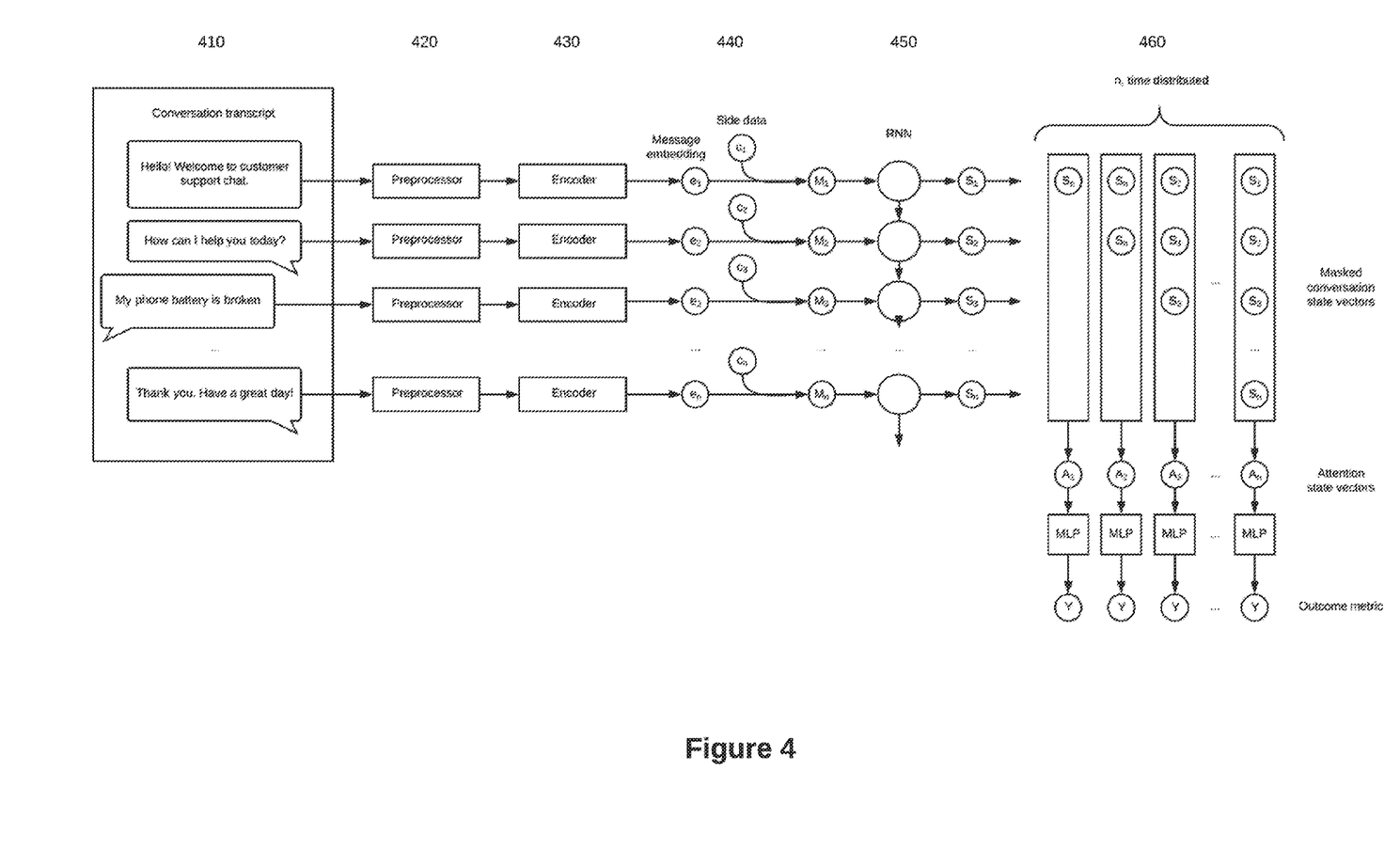
FIG. 4 depicts an exemplary overview of how what is displayed in the interface interacts with the systems within, and portrays an exemplary embodiment of the innards of the implementation, such as using a Neural Network 410.

FIG. 4 depicts at a broader level how the predicted metrics for the Conversational Analysis System 100 is calculated. It segments out several components, the conversational transcript 410, the preprocessor 420, the encoder 430, the side data insertion 440, the RNN 450, and the state vector/outcome production stage 460.

The conversational transcript 410 is the chat data pulled from FIG. 2, Chat Data Source 220. The conversational transcript 410 shows several back and forths in the conversation, when two individuals are chatting.

The preprocessor 420 is using the functionality of data preprocessing submodule 202, as discussed above with reference to FIG. 2.

The encoder 430, is using the functionality of data encoding submodule 203, as discussed above with reference to FIG. 2.

The side data insertion 440 discusses how the Model Production Module 200, discussed in FIG. 2, takes the result encoding and appends side data. This data includes a speaker flag (agent or customer), skill_name, and agent_embeddings.

The RNN 450, basically visually represent a Recursive Neural Network is iterating on turn-by-turn encodings provided by the encoder 430 and side data insertion 440. By iterating through these messages, we can form a formal context to represent the last utterance in the conversation.

Finally, the state vector/outcome production 460 section discusses how the RNN's state vectors are calculated through the data passed to the RNN 450. It then uses a Multi-Layer-Perceptron to determine the final outcome metric (like predicted NPS).

Figure 5:
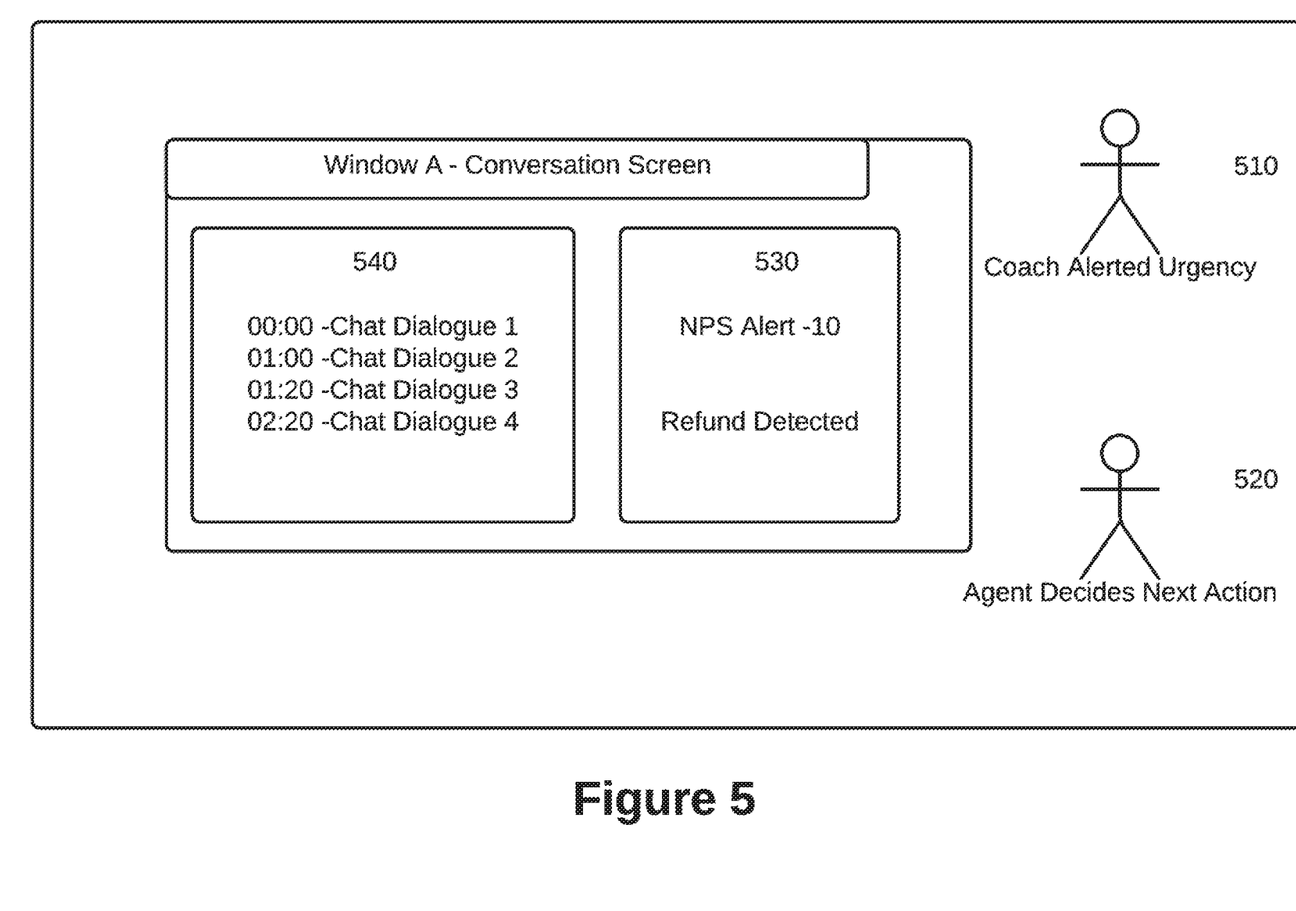
FIG. 5 depicts exemplary client enablement interfaces, and how different actors are affected by novel data.

FIG. 5 depicts an exemplary user interface for use of the conversational analysis system 100, from the user interface point of view. The figure includes two actors, Coach 510, and Agent 520. It also discusses several user interface elements, the predicted elements 530, and the actual chat dialogue 540.

In regards to the actors, both coaches 510 and agents 520 interact with this user interface, and see the same information described below. Both are using the interface to understand how predicted metric values are changing, and what direction to take the conversation.

In regards to the user interface elements, the screen would be the primary user interface users would see as referenced by the Conversational Analysis System in FIG. 1.

In which, the back-and-forth dialogue of a chat dialogue 540 will be displayed. Alongside, we will see a prediction of key metrics like NPS, noting at this point of time in the conversation, what the related value may be (like NPS has current predicted value of 7).

In addition, we can also see key moments in the conversation, such as 'refund detected'.

Computing Machine Architecture

Figure 6:
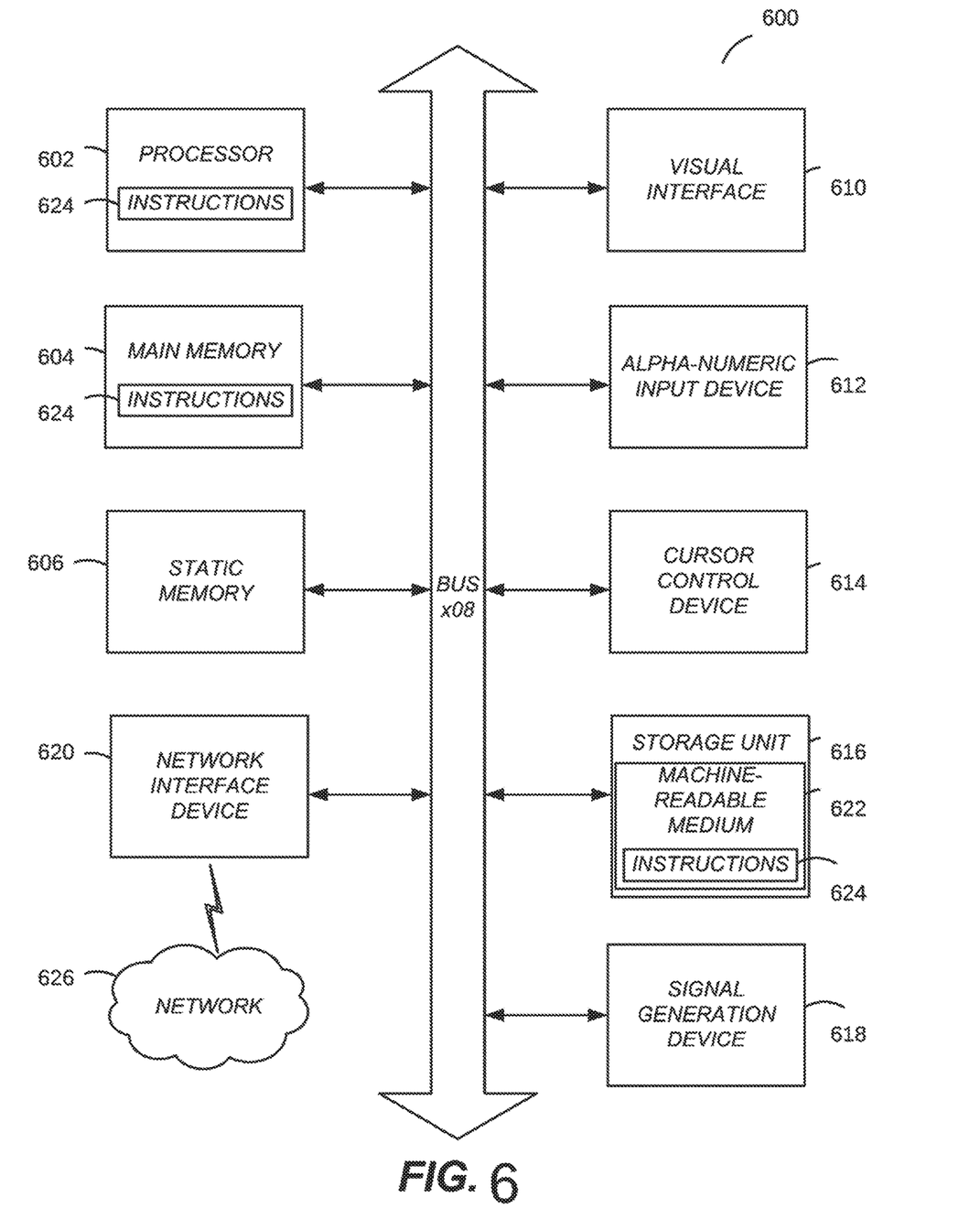
FIG. 6 is a block diagram illustrating components of an example machine able to read instructions from a machine-readable medium and execute them in a processor (or controller).

FIG. (FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a Conversational Analysis System through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for alerting a manager device to an occurrence of an event at an agent device during a conversation between the agent device and an external party, the method comprising:
   receiving transcript data during the conversation between the agent device and the external party;
   normalizing the transcript data, wherein normalizing the transcript data comprises anonymizing personal data within the transcript data;
   inputting the normalized transcript data into a machine learning model, the machine learning model trained to identify an inflection point in the conversation based on training samples, the training samples including labels indicating whether the inflection point has occurred with reference to textual transcript data and auxiliary transcript data of each given training sample;
   receiving, as output from the machine learning model, a measure of notability of the normalized transcript data;
   determining whether the measure of notability corresponds to the inflection point; and
   responsive to determining that the measure of notability corresponds to the inflection point, alerting the manager device,
   wherein determining whether the measure of notability corresponds to the inflection point comprises determining whether the measure of notability exceeds a threshold value, and
   wherein the measure of notability comprises a measure of decrease in an outcome metric, and wherein the threshold value comprises a relative decrease in the outcome metric from a value of the outcome metric at a prior point in the transcript data.

2. The method of claim 1, wherein the measure of notability comprises two or more notability parameters, a first of the notability parameters comprising a classification of a given segment of message text of the transcript data into a discrete event, a second of the notability parameters comprising a score of the given segment of message text.

3. The method of claim 2, wherein alerting the manager device comprises outputting a summary of the transcript text comprising both the first of the notability parameters and the second of the notability parameters.

4. The method of claim 1, wherein the training samples comprise normalized message text encoded to vector embeddings that have auxiliary data other than the message text concatenated to the vector embeddings.

5. The method of claim 1, wherein the machine learning model is trained continuously until a loss condition is met and, after the loss condition is met, the model is successfully validated against a validation set.

6. A non-transitory computer-readable medium comprising memory with instructions encoded thereon for alerting a manager device to an occurrence of an event at an agent device during a conversation between the agent device and an external party, the instructions, when executed, causing one or more processors to perform operations, the instructions comprising instructions to:
   receive transcript data during the conversation between the agent device and the external party;
   normalize the transcript data, wherein normalizing the transcript data comprises anonymizing personal data within the transcript data;
   input the normalized transcript data into a machine learning model, the machine learning model trained to identify an inflection point in the conversation based on training samples, the training samples including labels indicating whether the inflection point has occurred with reference to textual transcript data and auxiliary transcript data of each given training sample;

receive, as output from the machine learning model, a measure of notability of the normalized transcript data;

determine whether the measure of notability corresponds to the inflection point; and responsive to determining that the measure of notability corresponds to the inflection point, alert the manager device, wherein the instructions to determine whether the measure of notability corresponds to the inflection point comprise instructions to determine whether the measure of notability exceeds a threshold value, and wherein the measure of notability comprises a measure of decrease in an outcome metric, and wherein the threshold value comprises a relative decrease in the outcome metric from a value of the outcome metric at a prior point in the transcript data.

7. The non-transitory computer-readable medium of claim 6, wherein the measure of notability comprises two or more notability parameters, a first of the notability parameters comprising a classification of a given segment of message text of the transcript data into a discrete event, a second of the notability parameters comprising a score of the given segment of message text.

8. The non-transitory computer-readable medium of claim 7, wherein alerting the manager device comprises outputting a summary of the transcript text comprising both the first of the notability parameters and the second of the notability parameters.

9. The non-transitory computer-readable medium of claim 6, wherein the training samples comprise normalized message text encoded to vector embeddings that have auxiliary data other than the message text concatenated to the vector embeddings.

10. The non-transitory computer-readable medium of claim 6, wherein the machine learning model is trained continuously until a loss condition is met and, after the loss condition is met, the model is successfully validated against a validation set.

11. A system comprising:
memory with instructions encoded thereon for alerting a manager device to an occurrence of an event at an agent device during a conversation between the agent device and an external party; and
one or more processors that, when executing the instructions, are caused to perform operations comprising:
receiving transcript data during the conversation between the agent device and the external party;
normalizing the transcript data, wherein normalizing the transcript data comprises anonymizing personal data within the transcript data;
inputting the normalized transcript data into a machine learning model, the machine learning model trained to identify an inflection point in the conversation based on training samples, the training samples including labels indicating whether the inflection point has occurred with reference to textual transcript data and auxiliary transcript data of each given training sample;
receiving, as output from the machine learning model, a measure of notability of the normalized transcript data;
determining whether the measure of notability corresponds to the inflection point; and
responsive to determining that the measure of notability corresponds to the inflection point, alerting the manager device,
wherein determining whether the measure of notability corresponds to the inflection point comprises determining whether the measure of notability exceeds a threshold value, and
wherein the measure of notability comprises a measure of decrease in an outcome metric, and wherein the threshold value comprises a relative decrease in the outcome metric from a value of the outcome metric at a prior point in the transcript data.

12. The system of claim 11, wherein the measure of notability comprises two or more notability parameters, a first of the notability parameters comprising a classification of a given segment of message text of the transcript data into a discrete event, a second of the notability parameters comprising a score of the given segment of message text.

13. The system of claim 12, wherein alerting the manager device comprises outputting a summary of the transcript text comprising both the first of the notability parameters and the second of the notability parameters.

14. The system of claim 11, wherein the training samples comprise normalized message text encoded to vector embeddings that have auxiliary data other than the message text concatenated to the vector embeddings.

15. A method for alerting a manager device to an occurrence of an event at an agent device during a conversation between the agent device and an external party, the method comprising:
receiving transcript data during the conversation between the agent device and the external party;
normalizing the transcript data, wherein normalizing the transcript data comprises anonymizing personal data within the transcript data;
inputting the normalized transcript data into a machine learning model, the machine learning model trained to identify an inflection point in the conversation based on training samples, the training samples including labels indicating whether the inflection point has occurred with reference to textual transcript data and auxiliary transcript data of each given training sample;
receiving, as output from the machine learning model, a measure of notability of the normalized transcript data;
determining whether the measure of notability corresponds to the inflection point; and
responsive to determining that the measure of notability corresponds to the inflection point, alerting the manager device,
wherein the measure of notability comprises two or more notability parameters, a first of the notability parameters comprising a classification of a given segment of message text of the transcript data into a discrete event, a second of the notability parameters comprising a score of the given segment of message text, and
wherein alerting the manager device comprises outputting a summary of the transcript text comprising both the first of the notability parameters and the second of the notability parameters.

16. The method of claim 15, wherein determining whether the measure of notability corresponds to the inflection point comprises determining whether the measure of notability exceeds a threshold value.

17. The method of claim 16, wherein the measure of notability comprises a measure of decrease in an outcome metric, and wherein the threshold value comprises a relative decrease in the outcome metric from a value of the outcome metric at a prior point in the transcript data.

18. The method of claim 15, wherein the training samples comprise normalized message text encoded to vector embeddings that have auxiliary data other than the message text concatenated to the vector embeddings.

19. The method of claim 15, wherein the machine learning model is trained continuously until a loss condition is met and, after the loss condition is met, the model is successfully validated against a validation set.

20. A non-transitory computer-readable medium comprising memory with instructions encoded thereon for alerting a manager device to an occurrence of an event at an agent device during a conversation between the agent device and an external party, the instructions, when executed, causing one or more processors to perform operations, the instructions comprising instructions to:
 receive transcript data during the conversation between the agent device and the external party;
 normalize the transcript data, wherein normalizing the transcript data comprises anonymizing personal data within the transcript data;
 input the normalized transcript data into a machine learning model, the machine learning model trained to identify an inflection point in the conversation based on training samples, the training samples including labels indicating whether the inflection point has occurred with reference to textual transcript data and auxiliary transcript data of each given training sample;
 receive, as output from the machine learning model, a measure of notability of the normalized transcript data;
 determine whether the measure of notability corresponds to the inflection point; and
 responsive to determining that the measure of notability corresponds to the inflection point, alert the manager device,
 wherein the measure of notability comprises two or more notability parameters, a first of the notability parameters comprising a classification of a given segment of message text of the transcript data into a discrete event, a second of the notability parameters comprising a score of the given segment of message text, and
 wherein alerting the manager device comprises outputting a summary of the transcript text comprising both the first of the notability parameters and the second of the notability parameters.

21. The non-transitory computer-readable medium of claim 20, wherein the instructions to determine whether the measure of notability corresponds to the inflection point comprise instructions to determine whether the measure of notability exceeds a threshold value.

22. The non-transitory computer-readable medium of claim 21, wherein the measure of notability comprises a measure of decrease in an outcome metric, and wherein the threshold value comprises a relative decrease in the outcome metric from a value of the outcome metric at a prior point in the transcript data.

23. The non-transitory computer-readable medium of claim 20, wherein the training samples comprise normalized message text encoded to vector embeddings that have auxiliary data other than the message text concatenated to the vector embeddings.

24. The non-transitory computer-readable medium of claim 20, wherein the machine learning model is trained continuously until a loss condition is met and, after the loss condition is met, the model is successfully validated against a validation set.

25. A system comprising:
 memory with instructions encoded thereon for alerting a manager device to an occurrence of an event at an agent device during a conversation between the agent device and an external party; and
 one or more processors that, when executing the instructions, are caused to perform operations comprising:
 receiving transcript data during the conversation between the agent device and the external party;
 normalizing the transcript data, wherein normalizing the transcript data comprises anonymizing personal data within the transcript data;
 inputting the normalized transcript data into a machine learning model, the machine learning model trained to identify an inflection point in the conversation based on training samples, the training samples including labels indicating whether the inflection point has occurred with reference to textual transcript data and auxiliary transcript data of each given training sample;
 receiving, as output from the machine learning model, a measure of notability of the normalized transcript data;
 determining whether the measure of notability corresponds to the inflection point; and
 responsive to determining that the measure of notability corresponds to the inflection point, alerting the manager device,
 wherein the measure of notability comprises two or more notability parameters, a first of the notability parameters comprising a classification of a given segment of message text of the transcript data into a discrete event, a second of the notability parameters comprising a score of the given segment of message text, and
 wherein alerting the manager device comprises outputting a summary of the transcript text comprising both the first of the notability parameters and the second of the notability parameters.

26. The system of claim 25, wherein determining whether the measure of notability corresponds to the inflection point comprises determining whether the measure of notability exceeds a threshold value.

27. The system of claim 26, wherein the measure of notability comprises a measure of decrease in an outcome metric, and wherein the threshold value comprises a relative decrease in the outcome metric from a value of the outcome metric at a prior point in the transcript data.

28. The system of claim 25, wherein the training samples comprise normalized message text encoded to vector embeddings that have auxiliary data other than the message text concatenated to the vector embeddings.

\* \* \* \* \*